(12) United States Patent
Lee et al.

(10) Patent No.: US 8,369,389 B2
(45) Date of Patent: Feb. 5, 2013

(54) METHODS AND TRANSCEIVERS FOR CHANNEL CLASSIFICATION

(75) Inventors: Yang-Han Lee, Taipei (TW); Yi-Sing Hsiao, Taipei (TW); Jing-Shown Wu, Taipei (TW); Hen-Wai Tsao, Taipei (TW)

(73) Assignee: National Taiwan University, Taipei (TW)

( * ) Notice: Subject to any disclaimer, the term of this patent is extended or adjusted under 35 U.S.C. 154(b) by 257 days.

(21) Appl. No.: 12/793,180

(22) Filed: Jun. 3, 2010

(65) Prior Publication Data

US 2011/0142106 A1  Jun. 16, 2011

(30) Foreign Application Priority Data

Dec. 15, 2009  (TW) .............................. 98142838 A

(51) Int. Cl.
*H04B 1/38* (2006.01)
(52) U.S. Cl. .................... 375/219; 375/358; 370/208
(58) Field of Classification Search .............. 375/239, 375/260, 341, 219, 298, 316, 329, 340, 358–364; 370/203, 208, 441, 210, 503, 509–514, 522; 455/67.11
See application file for complete search history.

(56) References Cited

U.S. PATENT DOCUMENTS

| | | | | |
|---|---|---|---|---|
| 7,130,587 B2 * | 10/2006 | Hikokubo et al. | ......... | 455/67.11 |
| 7,376,075 B1 * | 5/2008 | Petranovich et al. | ......... | 370/208 |
| 7,688,710 B2 * | 3/2010 | Wu et al. | ........ | 370/208 |
| 2003/0072395 A1 * | 4/2003 | Jia et al. | .......... | 375/341 |
| 2006/0221807 A1 * | 10/2006 | Fukuoka et al. | .............. | 370/203 |
| 2008/0151989 A1 * | 6/2008 | Von Elbwart et al. | ........ | 375/239 |
| 2008/0253389 A1 * | 10/2008 | Larsson | ........................ | 370/441 |
| 2009/0003467 A1 * | 1/2009 | Chen | ................ | 375/260 |
| 2009/0034635 A1 * | 2/2009 | Golitschek Edler Von Elbwart et al. | ............................ | 375/260 |
| 2009/0161780 A1 * | 6/2009 | Schneider et al. | ............ | 375/260 |

OTHER PUBLICATIONS

Vitthaladevuni, P.K.; Alouini, M.-S.; , "A recursive algorithm for the exact BER computation of generalized hierarchical QAM constellations," Information Theory, IEEE Transactions on , vol. 49, No. 1, pp. 297-307, Jan. 2003.*

* cited by examiner

*Primary Examiner* — Tesfaldet Bocure
*Assistant Examiner* — Fitwi Hailegiorgis

(57) ABSTRACT

A transceiver used for an orthogonal frequency-division multiplexing (OFDM) system is provided, including: a signal processing device for receiving an OFDM symbol and processing the OFDM symbol to generate a processing signal according to the OFDM symbol, wherein the OFDM symbol having pilots which have been hierarchically modulated; a pilot signal analysis device for collecting the processing pilots of the processing signal and demodulating the processing pilots to generate a plurality of levels where one of the plurality of levels comprises a plurality of refinement bits; a degree difference analysis module for generating a plurality of degree differences according to the refinement bits and detecting channel classification according to the degree differences to transmit a channel classification signal; and a channel detection module for generating and transmitting a best modulation indication signal to another transceiver to adjust modulation scheme according to the channel classification signal.

32 Claims, 16 Drawing Sheets

METHODS AND TRANSCEIVERS FOR CHANNEL CLASSIFICATION

CROSS REFERENCE TO RELATED APPLICATIONS

This Application claims priority of Taiwan Patent Application No. 098142838 filed on Dec. 15, 2009, the entirety of which is incorporated by reference herein.

BACKGROUND OF THE INVENTION

1. Field of the Invention

The invention relates to channel classification, and more particularly, to methods and transceivers of channel classification using curves which have some relationship of ratios obtained by the hierarchical constellation, applied in orthogonal frequency division multiplexing (OFDM) systems.

2. Description of the Related Art

Recently, the application of the orthogonal frequency division multiplexing system has become one of the most important wireless communication technologies. Data can be easily and efficiently transmitted and received in the wireless communication environment because of the high transmission rate of the orthogonal frequency division multiplexing system. Therefore, the orthogonal frequency division multiplexing scheme is applied to, for example, Digital Audio Broadcasting (DAB), Digital Video Broadcasting-Terrestrial/Handheld (DVB-T/H), Wireless Fidelity (Wi-Fi) and Worldwide Interoperability for Microwave Access (WiMAX) etc., and the orthogonal frequency division multiplexing scheme has recently been regarded as a 4th-Generation Wireless System.

When the data transmitted by the orthogonal frequency division multiplexing scheme passes through the channel, the transmitted data will become distorted because of the channel effects. Therefore, the received data and the transmitted data are different. In order to solve this problem, the received data must be processed in the receiver such as in channel estimation and channel compensation etc. The channel effect must be estimated, which is regarded as channel estimation. The data affected by channel effect can be restored accurately to decrease the signaling distortion affected by channel effect such that the performance of orthogonal frequency-division multiplexing (OFDM) system becomes better and the bit error rate can be reduced. Therefore, determining how to classify channels is the most important challenge facing the development of the orthogonal frequency division multiplexing systems.

BRIEF SUMMARY OF THE INVENTION

One objective of the invention is to provide a transceiver used for an orthogonal frequency-division multiplexing (OFDM) system, comprising: a signal processing device for receiving an OFDM symbol and processing the OFDM symbol to generate a processing signal according to the OFDM symbol, wherein the OFDM symbol having pilots which have been hierarchically modulated and the processing signal having processing pilots; a pilot signal analysis device for collecting the processing pilots of the processing signal and demodulating the processing pilots to generate a plurality of levels where one of the plurality of levels comprises a plurality of refinement bits; a degree difference analysis module for generating a plurality of degree differences according to the refinement bits and detecting channel classification according to the degree differences to transmit a channel classification signal; and a channel detection module for generating and transmitting the best modulation indication signal to another transceiver to adjust the modulation scheme according to the channel classification signal, and detecting channel responses of the processed signal according to the processing pilots and compensating the processed signal to generate an output data.

Another objective of the invention is to provide a channel classification method used for an orthogonal frequency-division multiplexing (OFDM) system, comprising: modulating a plurality of pilots in an OFDM symbol hierarchically; transmitting the OFDM symbol, wherein the OFDM symbol is affected by channel effect; processing the OFDM symbol to generate a processing signal according to the OFDM symbol by a signal processing device, wherein the processing signal having processing pilots; collecting the processing pilots of the processing signal; demodulating the processing pilots; generating a plurality of degree differences according to the demodulated processing pilots, and detecting channel classification to transmit a channel classification signal to a channel detection module according to the degree differences; and transmitting a best modulation indication signal to another transceiver to adjust the modulation scheme according to the channel classification signal.

The advantage and spirit of the invention can be better understood by the following recitations together with the appended drawings.

BRIEF DESCRIPTION OF DRAWINGS

The invention can be more fully understood by reading the subsequent detailed description and examples with references made to the accompanying drawings, wherein:

FIG. 2-1 is a schematic diagram illustrating a 8-PSK hierarchical constellation according to an embodiment of the invention.

FIG. 2-2 is a schematic diagram illustrating a 64-QAM hierarchical constellation according to an embodiment of the invention.

FIG. 4-1 shows the curves of degree difference $D_{10}$ under the Gaussian white noise channel in the condition of the different parameters $\theta_1$ and $\theta_2$.

FIG. 4-2 shows the curves of degree difference $D_{10}$ under the Rayleigh fading channel in the condition of the different parameters $\theta_1$ and $\theta_2$.

FIG. 4-3 shows a comparison diagram between the curves of degree difference $D_{10}$ under Gaussian white noise channel and the curves of degree difference $D_{10}$ under Rayleigh fading channel.

FIG. 5-1 shows the curves of degree difference $D_{10}$ under Gaussian white noise channel in the condition of the different hierarchical level distance ratio $\lambda$.

FIG. 5-2 shows the curves of degree difference $D_{20}$ under the Gaussian white noise channel in the condition of the different hierarchical level distance ratio $\lambda$.

FIG. 5-3 shows the curves of degree difference $D_{10}$ under rhe Rayleigh fading channel in the condition of the different hierarchical level distance ratio $\lambda$.

FIG. 5-4 shows the curves of degree difference $D_{20}$ under the Rayleigh fading channel in the condition of the different hierarchical level distance ratio λ.

FIG. 6-1 is a curve diagram of Degree difference $D_{10}$ under the Gaussian white noise channel or the Rayleigh fading channel using the 64-QAM modulation scheme according to an embodiment of the invention.

FIG. 6-2 is curve diagram of the degree difference $D_{20}$ under the Gaussian white noise channel or the Rayleigh fading channel using 64-QAM modulation scheme according to an embodiment of the invention.

FIG. 7-1 is a curve diagram of Degree difference $D_{21}$ under the Gaussian white noise channel using the 64-QAM modulation scheme according to an embodiment of the invention, wherein the hierarchical level distance ratio λ is 0.75, 0.8, 0.9 or 1.15.

FIG. 7-2 is curve diagram of Degree difference $D_{21}$ under the Rayleigh fading channel using 64-QAM modulation scheme according to an embodiment of the invention, wherein the hierarchical level distance ratio λ is 0.75, 0.8, 0.9 or 1.15.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference the appended claims.

Figure 1:
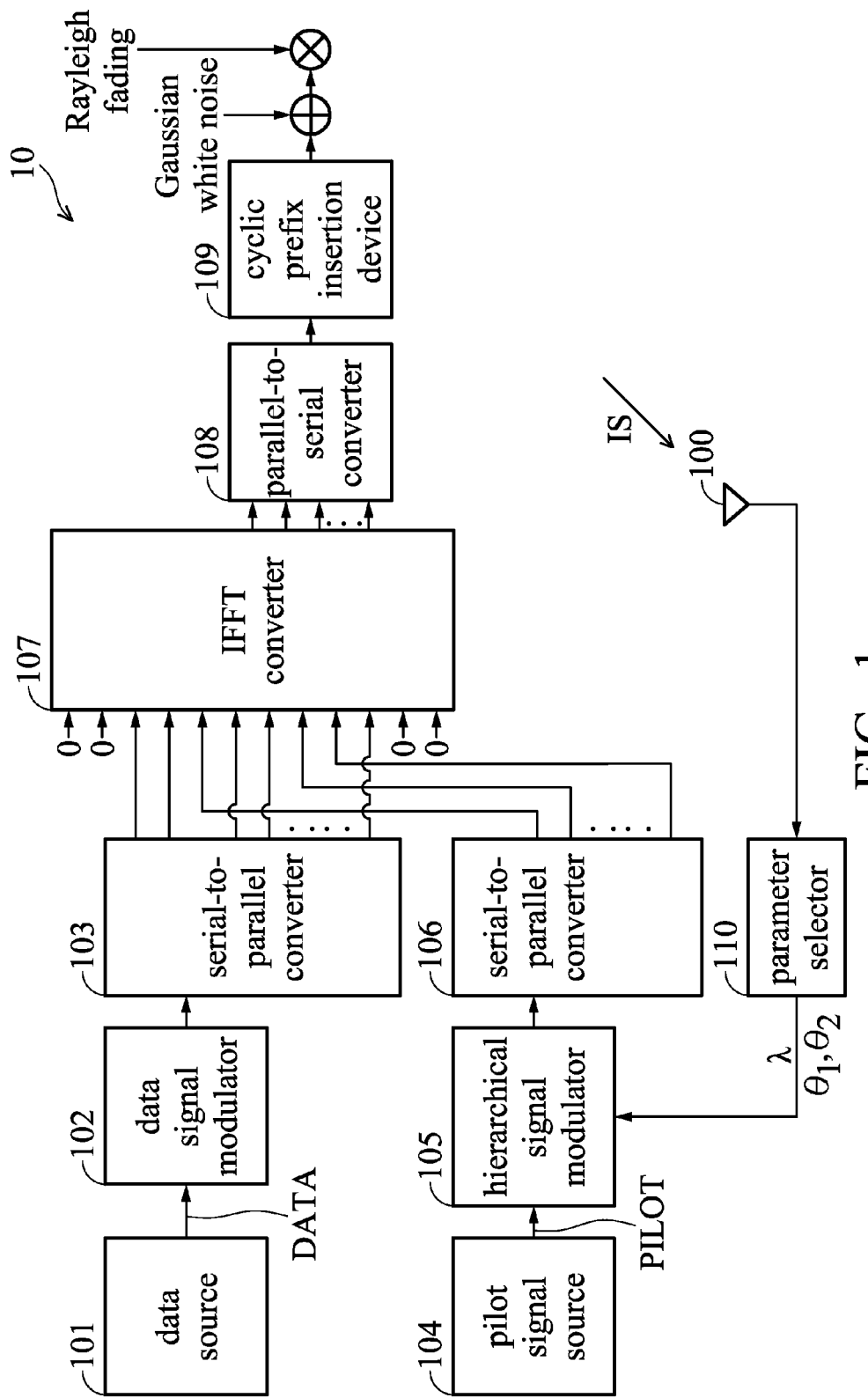
FIG. 1 is a block diagram illustrating a transceiver 10 for transmitting an Orthogonal Frequency Division Multiplexing (OFDM) symbol which has pilots which have been modulated hierarchically, and adjusting the modulation scheme of the pilots based on the received best modulation indication signal IS in the transceiver 10 according to an embodiment of the invention.

FIG. 1 is a block diagram illustrating a transceiver 10 for transmitting an Orthogonal Frequency Division Multiplexing (OFDM) symbol which has pilots which have been modulated hierarchically, and adjusting the modulation scheme of the pilots base on the best received modulation indication signal IS in the transceiver 10 according to an embodiment of the invention. The transceiver 10 may comprise a data source 101 for generating and outputting the digital data bits DATA to a data signal modulator 102. The data signal modulator 102 is configured to modulate the received digital data bits DATA. For example, the received digital data bits DATA are modulated to generate the modulated in-phase/quadrature-phase data signal by using binary phase shift keying (BPSK), quadrature phase shift keying (QPSK) or quadrature amplitude modulation (QAM) such as 16-QAM, 64-QAM and 128-QAM etc. A serial-to-parallel converter 103 will convert the serial modulated in-phase/quadrature-phase data signal into the parallel modulated in-phase/quadrature-phase data signal, and the parallel modulated in-phase/quadrature-phase data signal passed by the serial-to-parallel 103 is outputted to an inverse fast Fourier transform (IFFT) converter 107 which has N-points inverse fast Fourier transform (IFFT).

At the same time, a pilot signal source 104 generates and outputs a plurality of pilots PILOT to a hierarchical signal modulator 105. The hierarchical signal modulator 105 is configured to hierarchically modulate the received pilots PILOT by using an 8-phase shift keying (8-PSK) hierarchical constellation or a 64-quadrature amplitude modulation (64-QAM) hierarchical constellation according to the best modulation indication signal IS received by a parameter selector 110 in the transceiver 10.

In the embodiment of the invention, if the best modulation indication signal IS received by the parameter selector 110 in the transceiver 10 indicates that phase shift keying (PSK) hierarchical constellation is the modulation scheme for the pilots, the parameter selector 110 inputs a first adjustable phase parameter $\theta_1$ and a second adjustable phase parameter $\theta_2$ to control or adjust a distribution of a plurality of constellation points of the phase shift keying (PSK) hierarchical constellation. The hierarchical signal modulator 105 modulates the received pilots PILOT by using the 8-phase shift keying (8-PSK) hierarchical constellation (as shown in the FIG. 2-1) adjusted by the parameter selector 110.

In another embodiment of the invention, if the best modulation indication signal IS received by the parameter selector 110 in the transceiver 10 indicates that the 64-quadrature amplitude modulation (64-QAM) hierarchical constellation is the modulation scheme of the pilots, the parameter selector 110 inputs a hierarchical level distance ratio λ to control or adjust a distribution of a plurality of constellation points of the 64-quadrature amplitude modulation (64-QAM) hierarchical constellation. The hierarchical signal modulator 105 modulates the received pilots PILOT by using the 64-quadrature amplitude modulation (64-QAM) hierarchical constellation (as shown in the FIG. 2-2) adjusted by the parameter selector 110.

The received pilots PILOT are modulated by the hierarchical signal modulator 105 using a hierarchical modulation scheme to generate the modulated in-phase/quadrature-phase pilot signals, then the hierarchical signal modulator 105 outputs the modulated in-phase/quadrature-phase pilot to a serial-to-parallel converter 106.

The parallel modulated in-phase/quadrature-phase pilots passed by the serial-to-parallel 106 are outputted to the inverse fast Fourier transform (IFFT) converter 107 which has N-points inverse fast Fourier transform (IFFT). The modulated in-phase/quadrature-phase pilots and the modulated in-phase/quadrature-phase data signals are transformed from the time domain to the frequency domain by the inverse fast Fourier transform (IFFT) converter 107, and a plurality of symbols are outputted. The symbols are transferred from parallel form to serial form by a parallel-to-serial converter 108.

Finally, a guard interval (GI) which is a copied section from the end of the symbol is added to the symbols to generate and transmit the OFDM symbols by a cyclic prefix (CP) insertion device 109. Adding the guard interval (GI), the head of the symbol can maintain the continuity of the OFDM symbols. In the transmitting procedure, due to the effect of channel fading, such as Rayleigh fading or Gaussian white noise, when another transceiver 20 receives the OFDM symbol which is affected by channel effect, the transceiver 20 processes the received OFDM symbol and estimates channel properties using the hierarchical modulated pilots which may be modulated by using the 8-phase shift keying (8-PSK) modulation scheme or the 64-quadrature amplitude modulation (64-QAM) scheme. The transceiver then transmits the best modulation indication signals IS according to the channel properties to perform real-time adjustment modulation of the transceiver 10, to improving the channel classification of the OFDM symbols in the transceiver 10 to reduce the bit error rate of system.

Figure 2:
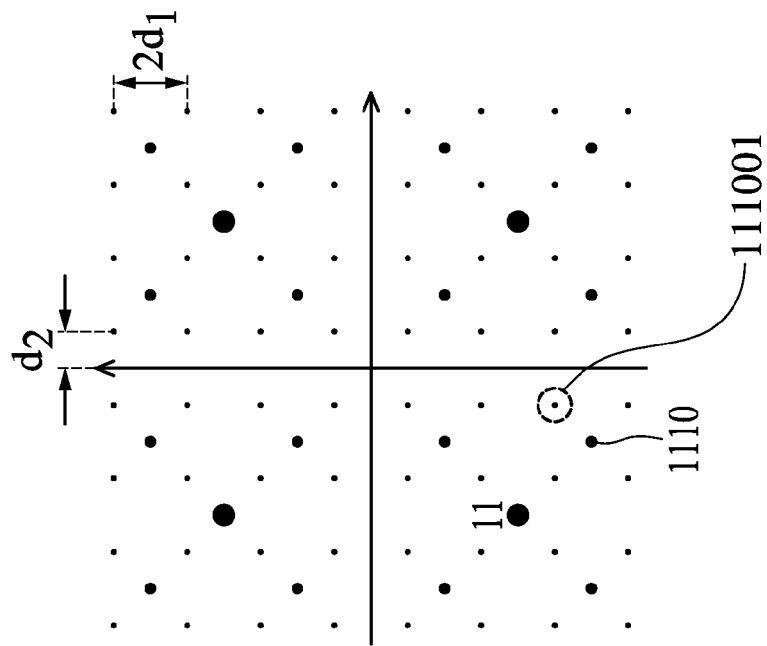
Figures 1, 2:
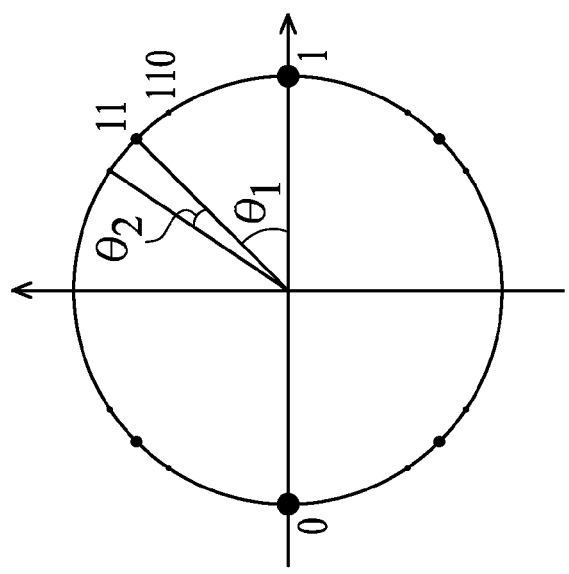

FIG. 2-1 is a schematic diagram illustrating an 8-PSK hierarchical constellation according to an embodiment of the invention. As shown in the FIG. 1, the hierarchical signal modulator 105 modulates the received pilots by using 8-PSK hierarchical modulation to generate the modulated I/Q pilot signals. Furthermore, the modulated I/Q pilot signals corresponding to the received pilots are mapped according to the 8-PSK hierarchical constellation as shown in the FIG. 2-1.

In 8-PSK hierarchical constellation as shown in the FIG. 2-1, there are three levels, wherein one of three levels comprises at least one refinement bit. The base bit in a base level determines a biggest point shown in the FIG. 2-1. In other words, the one base bit in the base level determines the biggest point as BPSK. In the same way, a middle point shown in the FIG. 2-1 is determined by one refinement bit in a first level, and a smallest point shown in the FIG. 2-1 is determined by one refinement bit in a second level.

For example, a binary digit sequence "110" is generated by the pilot signal source 104. Taking the FIG. 2-1 as an example, the constellation point corresponding to the binary digit sequence "110" is obtained by 8-PSK hierarchical constellation. The biggest point at the right part of the 8-PSK hierarchical constellation is obtained according to the base level which has only one base bit "1". The biggest point at the right part of the 8-PSK hierarchical constellation is then regarded as a center, and the middle point at the above part of the selected biggest point which at the right part of the 8-PSK hierarchical constellation is obtained according to the first level which has only one refinement bit "1". The middle point at the upper-right part of the 8-PSK hierarchical constellation is then regarded as a center, and the smallest point at below part of the selected middle point is obtained according to the second level which has only one refinement bit "0". In order to generate an I/Q pilot signal corresponding to the pilot, the constellation point corresponding to the sequence "110" is mapped in the FIG. 2-1 according to the above steps. Demodulation the a reverse procedure of modulation. The received I/Q pilot signals is mapped to the constellation points in the 8-PSK hierarchical constellation, and then refinement bits in each level corresponding to one of the constellation points are obtained. Moreover, the embodiment of the invention does not limit to the above described mapping method, such as gray code is also a mapping method.

In addition, the first adjustable phase parameter $\theta_1$ and second adjustable phase parameter $\theta_2$ control positions of a plurality of constellation points of the phase shift keying (PSK) hierarchical constellation. The first adjustable phase parameter $\theta_1$ is configured to adjust an angle between a constellation point corresponding to the base level (the zero level) and a constellation point corresponding to the first level. In other words, the first adjustable phase parameter $\theta_1$ is configured to adjust a distance between a constellation point corresponding to the base level and a constellation point corresponding to the first level. The second adjustable phase parameter $\theta_2$ is configured to adjust to an angle between a constellation point corresponding to the first level and a constellation point corresponding to the second level. In other words, the second adjustable phase parameter $\theta_2$ is configured to adjust to a distance between a constellation point corresponding to the first level and a constellation point corresponding to the second level. If the first adjustable phase parameter $\theta_1$ and second adjustable phase parameter $\theta_2$ are adjusted, the distribution of the constellation points of the phase shift keying (PSK) hierarchical constellation will change.

FIG. 2-2 is a schematic diagram illustrating a 64-QAM hierarchical constellation according to an embodiment of the invention. As shown in the FIG. 1, the hierarchical signal modulator 105 modulates the received pilots by using 64-QAM hierarchical constellation to generate the modulated I/Q pilot signals. In the 64-QAM scheme, the modulated I/Q pilot signals corresponding to the received pilots are mapped according to 64-QAM hierarchical constellation in the 64-QAM scheme.

In the 64-QAM hierarchical constellation as shown in the FIG. 2-2, there are three levels, wherein one of three levels comprises at least one refinement bit. The biggest point shown in the FIG. 2-2 is determined by the base bits in the zero level (or the base level). In other words, the two base bits in the base level jointly determine the biggest point as QPSK in FIG. 2-2. In the same way, a middle point shown in the FIG. 2-2 is determined by the two refinement bits of the first level, and a smallest point shown in the FIG. 2-2 is determined by the two refinement bits of the second level.

For example, a binary digit sequence "111001" is generated by the pilot signal source 104. Taking FIG. 2-2 as an example, the constellation point corresponding to the binary digit sequence "111001" is obtained according to the 64-QAM hierarchical constellation. First, the zero level which has two base bits "11" of the binary digit sequence "111001" determine the biggest point at the lower-left corner of the 64-QAM hierarchical constellation. The biggest point at the lower-left corner of the 64-QAM hierarchical constellation is then regarded as the center, and the first level which has two refinement bits "10" determines the middle point at the down-right corner of the selected biggest point which is the down-left corner of the 64-QAM hierarchical constellation. The middle point at the down-right corner of the 64-QAM hierarchical constellation is then regarded as a center, and the second level which has two refinement bits "01" determines the smallest point at the upper-right corner of the selected middle point. In order to generate a I/Q pilot signal corresponding to the pilot, the constellation point corresponding to the sequence "111001" is mapped in the FIG. 2-1 according to the above steps. Demodulation is the reverse procedure of modulation. The received I/Q pilot signals are mapped to the constellation points in the 64-QAM hierarchical constellation, and then the refinement bits in each level corresponding to one of the constellation points are obtained. Moreover, the embodiment of the invention is not limited to the above described mapping method, such as other mapping method.

In addition, the parameters $2d_1$ and $d_2$ as shown in the FIG. 2-2 represent the distance between the constellation points in the 64-QAM hierarchical constellation respectively, wherein the parameter $2d_1$ represents the x-axis distance between one constellation point of the first level (the middle point) and another constellation point of the first level (the middle point) as shown in the FIG. 2-2 such that the parameter $d_1$ represents the y-axis distance between the constellation point of the second level (the smallest point) and the constellation point of the first level (the middle point), and the parameter $d_2$ represents the x-axis distance between the constellation point of the first level (the middle point) and the y-axis. A hierarchical level distance ratio $\lambda$, $\lambda = d_1/d_2$, is defined. If the hierarchical level distance ratio $\lambda$ is adjusted, the distribution of the constellation points of the 64-QAM hierarchical constellation will change.

Figure 3:
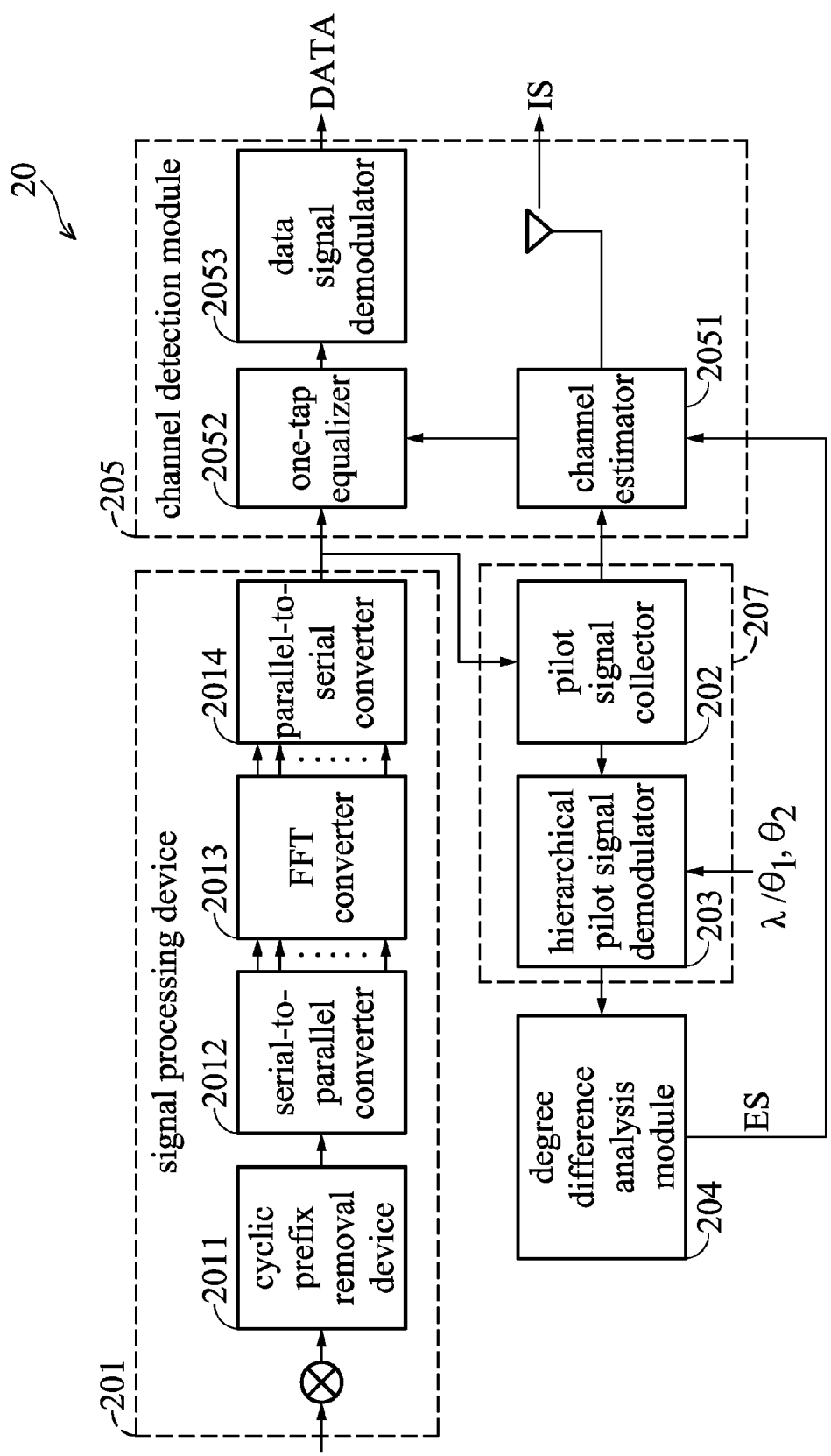
FIG. 3 is a block diagram illustrating a transceiver 20 according to an embodiment of the invention.

FIG. 3 is a block diagram illustrating a transceiver 20 according to an embodiment of the invention. The transceiver 20 receives and processes an OFDM symbol affected by Rayleigh fading channel and Gaussian white noise, and estimates the channel properties by using the hierarchical modulated pilots (8-PSK or 64-QAM modulation scheme may be used). The functional blocks in the transceiver 20 are the inverse of the functional blocks in the transceiver 10 to demodulate signals. The transceiver 20 in the FIG. 3 comprises a signal processing device 201 for receiving an OFDM symbol and processing the OFDM symbol according to the OFDM symbol, wherein the OFDM symbol has pilots which have been hierarchically modulated. The signal processing device 201 further comprises a cyclic prefix (CP) removal device 2011 for removing the added guard interval (GI) in the transceiver 10. A serial-to-parallel converter 2012 is configured to transfer the symbols from serial form to parallel form. The symbols are transformed from the frequency domain to the time domain by the fast Fourier transform (FFT) converter 2013 and the fast Fourier transform (FFT) converter 2013 outputs the I/Q data signals and the I/Q pilot signals. A parallel-to-serial converter 2014 is configured to convert the I/Q data signals and the I/Q pilot signals from parallel form to serial form, wherein the I/Q data signals and the I/Q pilot signals are defined as the processed signals.

Furthermore, a pilot signal analysis device 207 in the transceiver 20 comprises a pilot signal collector 202 for collecting the I/Q pilot signals of the I/Q data signals and the I/Q pilot signals outputted by the parallel-to-serial converter 2014. The pilot signal analysis device 207 further comprises a hierarchical pilot signal demodulator 203 for demodulating the I/Q pilot signals in the OFDM symbols and outputting a plurality of pilots.

Taking the 8-PSK hierarchical constellation in the FIG. 2-1 as an example, each of the collected I/Q pilot signals is demodulated to obtain three binary bits, wherein the base level comprises the first binary bit, the first level comprises the second binary bit, and the second level comprises the third binary bit. Furthermore, the bits in each level are inputted to a degree difference analysis module 204.

Taking the 64-QAM hierarchical constellation in FIG. 2-2 as an example, each of the collected I/Q pilot signals is demodulated to obtain six binary bits, wherein the base level comprises the first and second binary bits, the first level comprises the third and fourth binary bits, and the second level comprises the fifth and sixth binary bits. Furthermore, the bits in each level are inputted to the degree difference analysis module 204.

The degree difference analysis module 204 detects channel classification according to the degree differences of the refinement bits in each level which the refinement bits in each level is corresponded to the demodulated pilot. For the hierarchical constellation, different levels have different protection priority. Degree difference is defined as a ratio of bit error rates of refinement bits in any two levels under same carrier to noise ratio (CNR). In other words, Degree difference $D_{ab}$ is defined as a ratio of bit error rate of refinement bits in a a'th level divided by bit error rate of refinement bits in a b'th level under same carrier to noise ratio (CNR), and the following expression is:

$$\text{Degree Difference } D_{ab} = \frac{BER \text{ of } a}{BER \text{ of } b} \text{ (dB)} \bigg|_{under\ same\ CNR}$$

Therefore, Degree difference $D_{10}$ is a value of bit error rate of refinement bits in first level divided by bit error rate of base bits in a base level under same carrier to noise ratio (CNR). Degree difference $D_{21}$ is a value of bit error rate of refinement bits in a second level divided by bit error rate of refinement bits in a first level under same carrier to noise ratio (CNR). Degree difference $D_{20}$ is a value of bit error rate of refinement bits in a second level divided by bit error rate of base bits in a base level. The following expression is:

$$\text{Degree difference } D_{21} = \frac{BER \text{ of } 2^{nd} \text{ refinement bits}}{BER \text{ of } 1^{st} \text{ refinement bits}} \text{ (dB)} \bigg|_{under\ same\ CNR}$$

$$\text{Degree difference } D_{10} = \frac{BER \text{ of } 1^{st} \text{ refinement bits}}{BER \text{ of base bits}} \text{ (dB)} \bigg|_{under\ same\ CNR}$$

$$\text{Degree difference } D_{20} = \frac{BER \text{ of } 2^{nd} \text{ refinement bits}}{BER \text{ of base bits}} \text{ (dB)} \bigg|_{under\ same\ CNR}$$

The pilot signal analysis module 204 generates a plurality of degree difference curves according to the degree differences under different CNR and classifies channels according to properties of the degree difference curves to generate a channel classification signal ES to a channel estimator 2051 of the channel detection module 205 in the transceiver 20.

The channel estimator 2051 detects channel responses according to the collected I/Q pilot signals, and adjusts the modulation scheme of the transceiver 10 according to the received channel classification signal ES. Therefore, the channel estimator 2051 transmits the best modulation indication signal IS to the transceiver 10 through an antenna 200 according to the received channel classification signal ES to adjusts modulation scheme of transceiver 10 to 8-PSK or 64-QAM scheme.

The channel detection module 205 comprises a one-tap equalizer 2052 for compensating the channel responses according to the channel responses detected by the channel estimator 2051 to compensate the effect from the channel fading, in order to prevent the transmitted signals from becoming distorted. In addition, a data signal demodulator 2053 demodulates I/Q data signals to generate the digital data bits DATA.

Figures 1, 4:
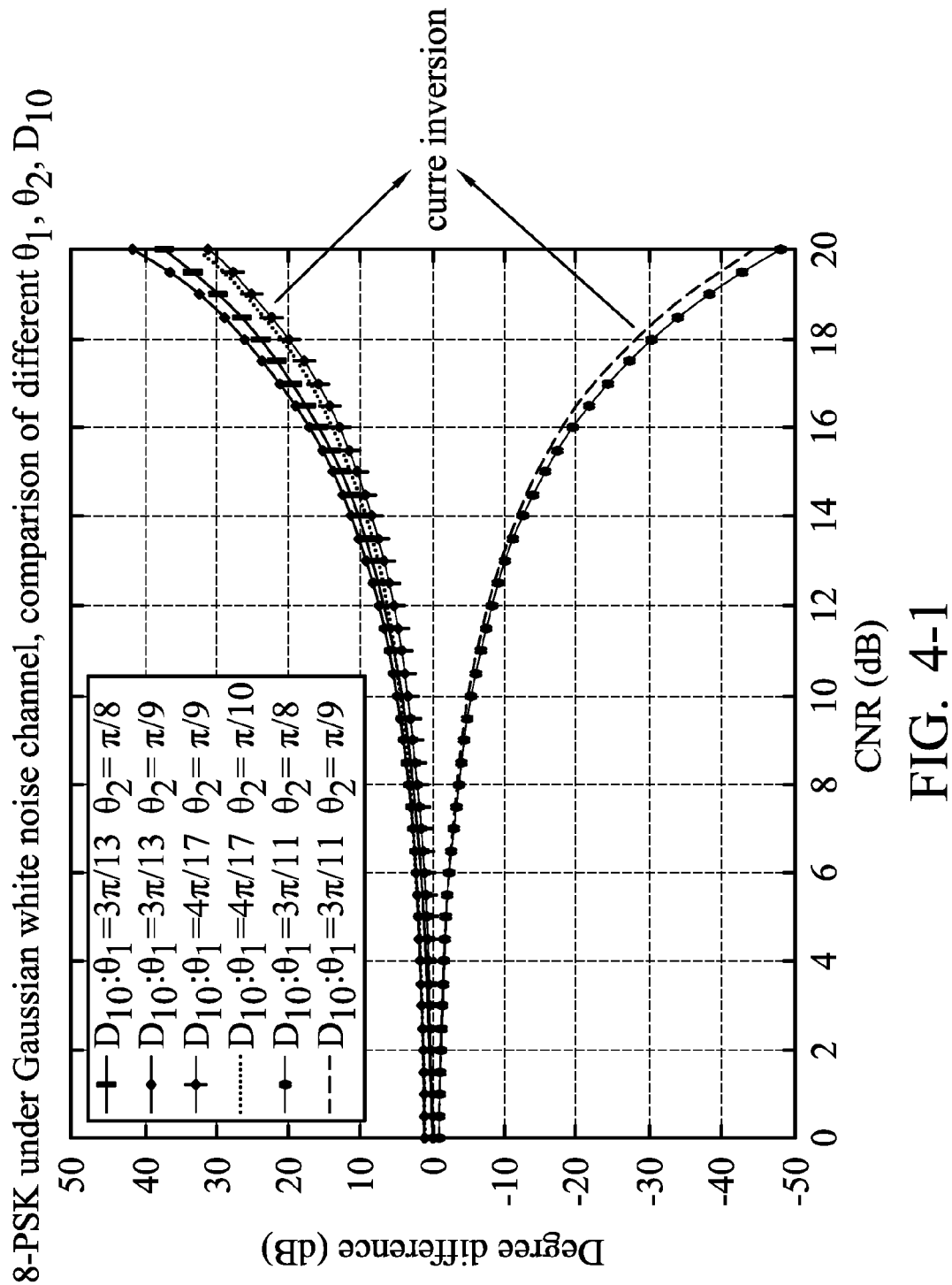
Figures 2, 4:
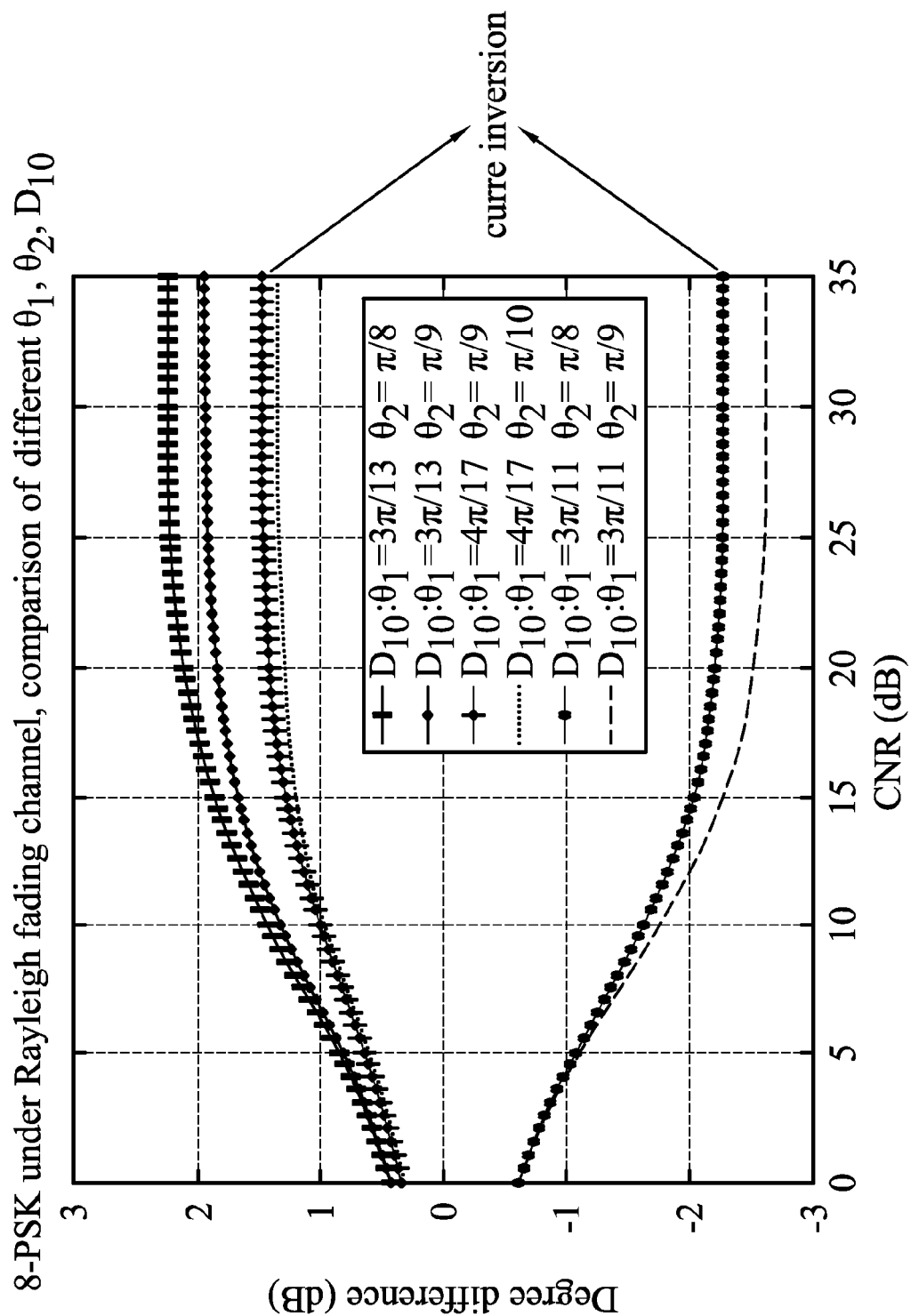
Figures 3, 4:
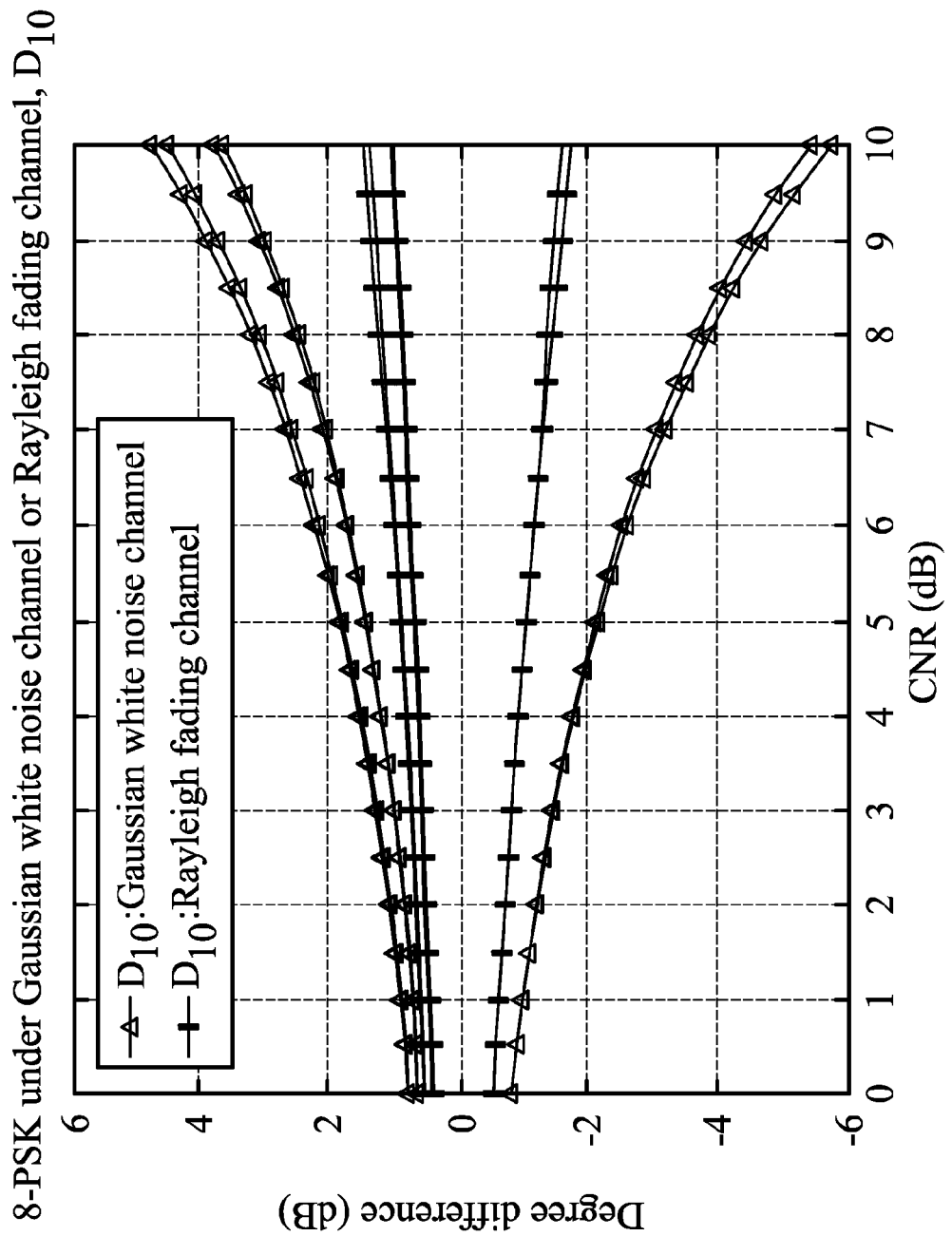

FIGS. 4-1, 4-2 and 4-3 are curve diagrams of Degree difference $D_{10}$ by using the 8-PSK modulation scheme according to an embodiment of the invention, wherein the first adjustable phase parameter $\theta_1$ and second adjustable phase parameter $\theta_2$ control positions of a plurality of constellation points of the phase shift keying (PSK) hierarchical constellation, and the vertical axis represents degree difference (dB), and the horizontal axis represents the carrier to noise ratio (CNR). FIG. 4-1 shows the curves of degree difference $D_{10}$ under the Gaussian white noise channel in the condition of the different parameters $\theta_1$ and $\theta_2$. FIG. 4-2 shows the curves of degree difference $D_{10}$ under Rayleigh fading channel in the condition of the different parameters $\theta_1$ and $\theta_2$. FIG. 4-3 shows comparison diagram between the curves of degree difference $D_{10}$ under Gaussian white noise channel and the curves of degree difference $D_{10}$ under Rayleigh fading channel.

According to the FIG. 4-1, the parameters $(\theta_1, \theta_2)$ is $(3\pi/13, \pi/8)$, $(3\pi/13, \pi/9)$, $(4\pi/17, \pi/9)$ or $(4\pi/17, \pi/10)$ in the 8-PSK hierarchical constellation. The curves of degree difference $D_{10}$ under Gaussian white noise channel will increase as CNR rises such as the curves of above part in the FIG. 4-1, and the curves of degree difference $D_{10}$ under Gaussian white noise channel are concave. According to the FIG. 4-2, the parameters $(\theta_1, \theta_2)$ are $(3\pi/13, \pi/8)$, $(3\pi/13, \pi/9)$, $(4\pi/17, \pi/9)$ or $(4\pi/17, \pi/10)$ in the 8-PSK hierarchial constellation. The curves of degree difference $D_{10}$ under Rayleigh fading channel will increase as CNR rises at first, but finally the curves will tend to saturate such as the curves of the above part in the FIG. 4-2. The curves of degree difference $D_{10}$ under Rayleigh fading channel are convex. There are different tendencies and properties between the degree differences under the two different channels, this can be a foundation for channel classification.

In addition, according to the FIGS. 4-1 and 4-2, no matter whether Gaussian white noise channel or the Rayleigh fading channel is applied, the curves of degree difference $D_{10}$ have the phenomenon of "Downward Inversion" when the parameters $(\theta_1,\theta_2)$ is $(3\pi/11,\pi/8)$ or $(3\pi/11,\pi/9)$. The phenomenon of "Downward Inversion" is known as "Curve Inversion". It meas the protection priority of different levels has changed according to the phenomenon of "Curve Inversion". In other words, the protection priority of the base level is lower than the first level such that the "Curve Inversion" phenomenon occurs.

If the "Curve Inversion" phenomenon happens, the curves of degree difference $D_{10}$ under Gaussian white noise channel will decrease as CNR rises and then the curves will tend to saturate. The curves of degree difference $D_{10}$ are convex such as the curves of below part in the FIG. 4-1. However, if the phenomenon of "Curve Inversion" happens, the curves of degree difference $D_{10}$ under Rayleigh fading channel will decrease as CNR rises and then the curves will tend to saturate. The curves of degree difference $D_{10}$ are concave such as the curves of below part in the FIG. 4-2.

According to the above analysis, degree difference in one curve may increase as CNR rises and degree difference in the other curve may decrease as CNR rises, because the parameters $(\theta_1,\theta_2)$ may cause two different curves. Therefore, the parameters $(\theta_1,\theta_2)$ may adjust protection ability of each level. The parameters $(\theta_1,\theta_2)$ can adjust protection ability of each level to protect the most important bits or the bits which have the most priority based on the channel condition.

As shown in the FIG. 4-3, the tendency of the curves is not obvious in the different channels such as Gaussian white noise channel or Rayleigh fading channel when the curves of degree difference $D_{10}$ is under lower CNR. Thus, what channels are distinguished according to the absolute value of degree difference $D_{10}$. The absolute value of degree differences $D_{10}$ under Gaussian white noise channel must be larger than the absolute values of degree differences $D_{10}$ under Rayleigh fading channel. Therefore, the channel classification can be still applied under the lower CNR.

In addition, the degree differences $D_{21}$ or the degree differences $D_{20}$ in the 8-PSK hierarchical constellation also can provide channel information such as the degree differences $D_{10}$. However, channel classification is most easily achieved by using the curves of degree differences $D_{10}$.

FIGS. 5-1, 5-2, 5-3 and 5-4 are curve diagrams of Degree difference $D_{10}$ and Degree difference $D_{20}$ by using 64-QAM modulation scheme under the different channels according to an embodiment of the invention, wherein a hierarchical level distance ratio $\lambda$, $\lambda=d_1/d_2$, controls positions of a plurality of constellation points of the 64-QAM hierarchical constellation and the vertical axis represents degree difference (dB), and the horizontal axis represents the carrier to noise ratio (CNR).

Figures 1, 5:
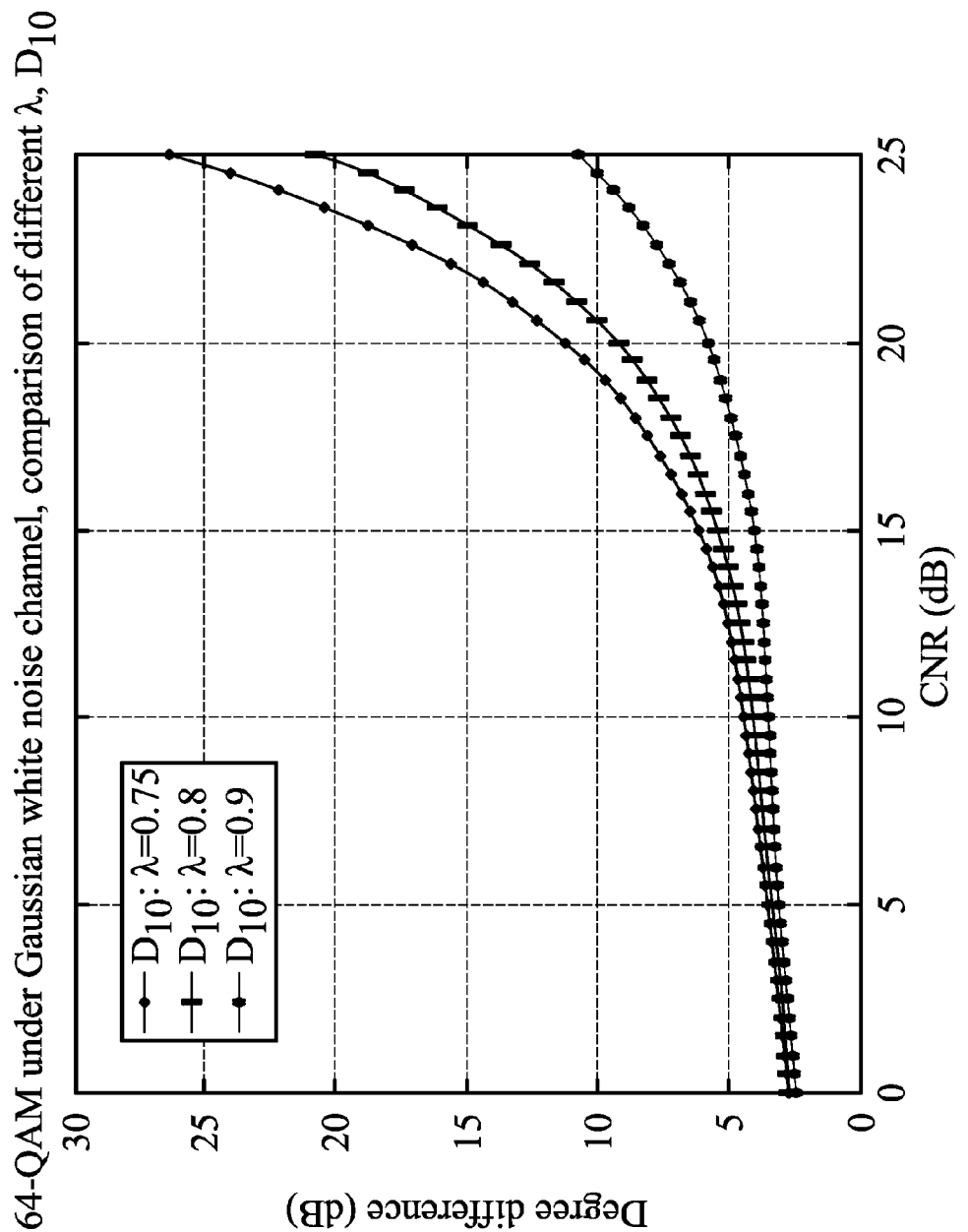
Figures 2, 5:
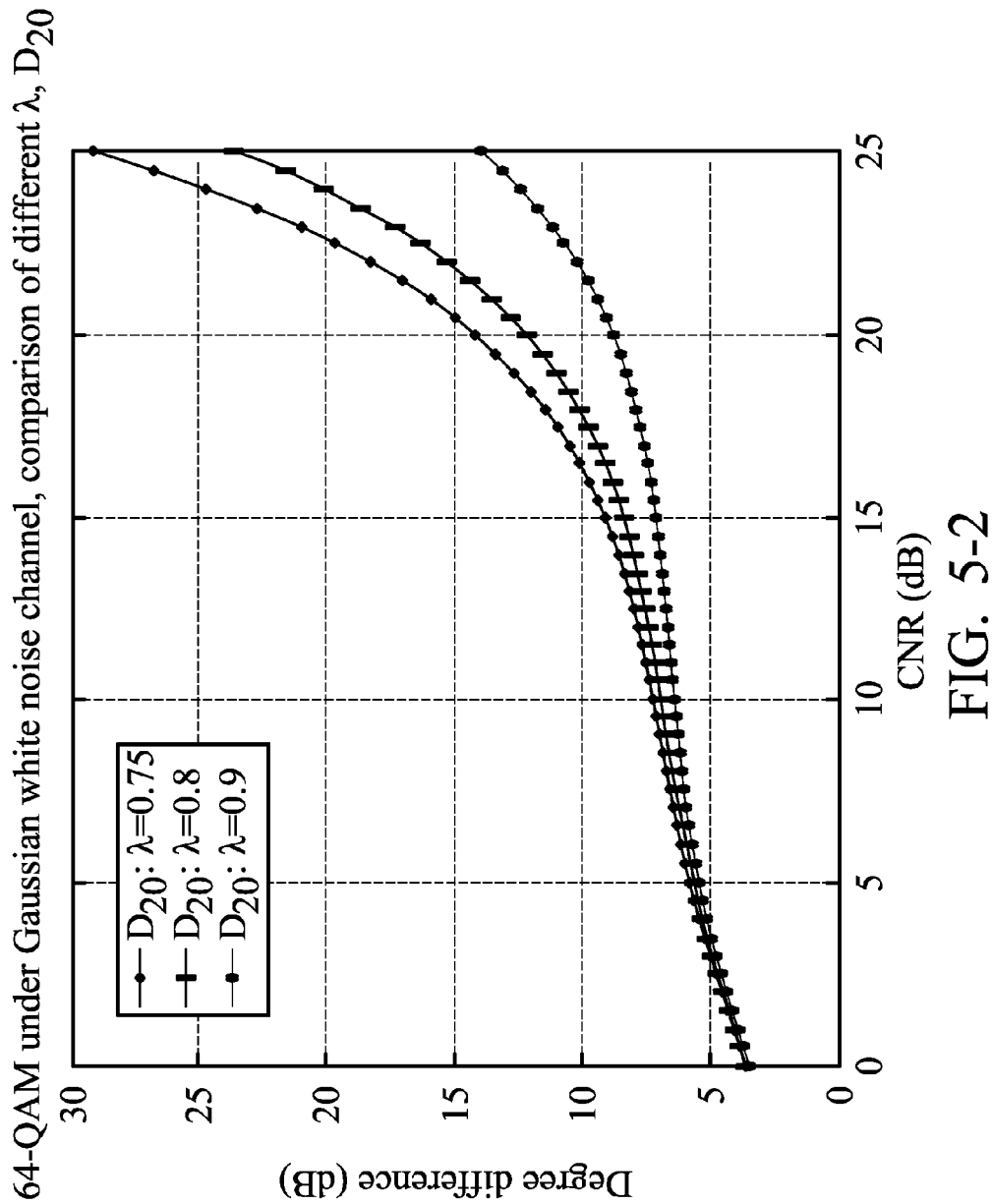
Figures 3, 5:
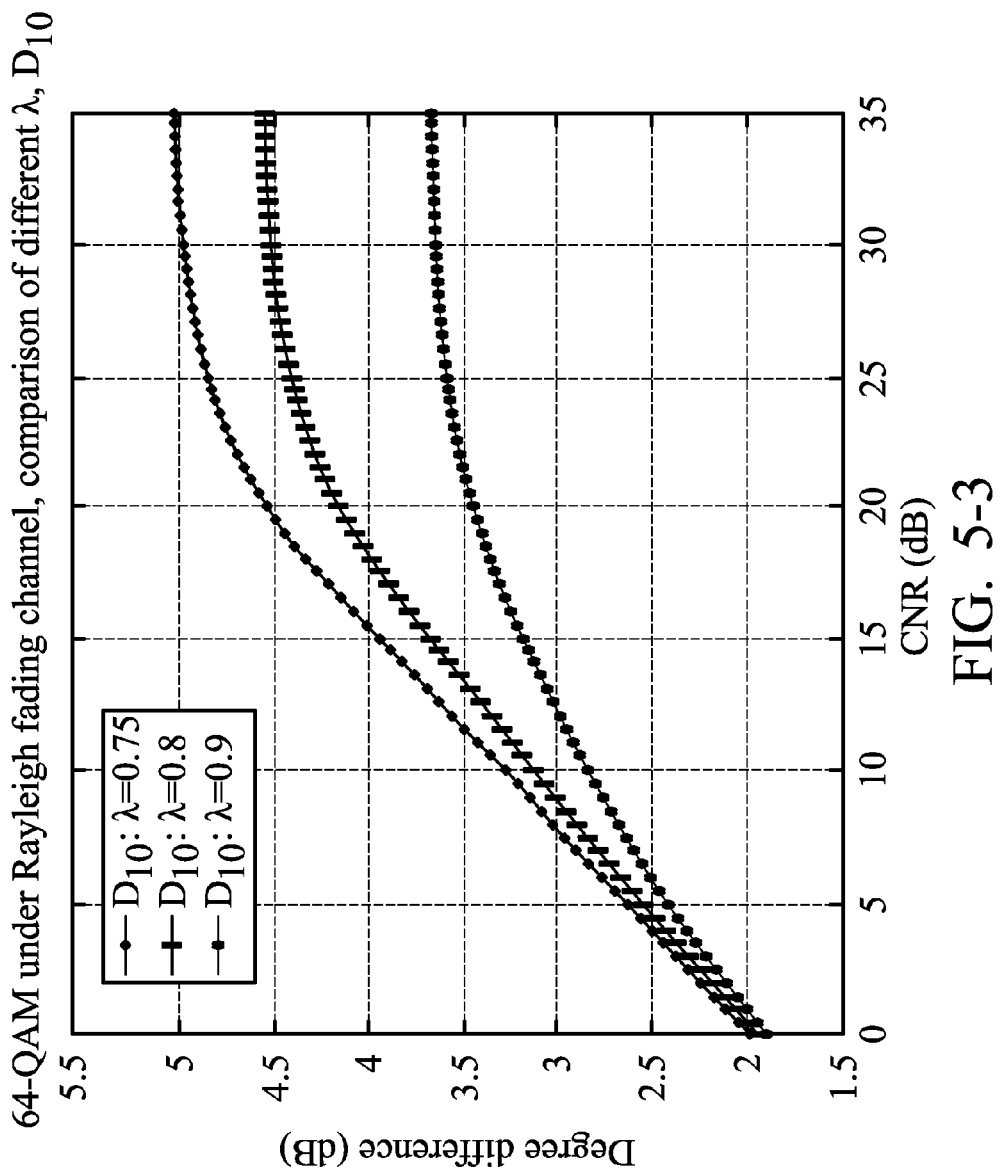
Figures 4, 5:
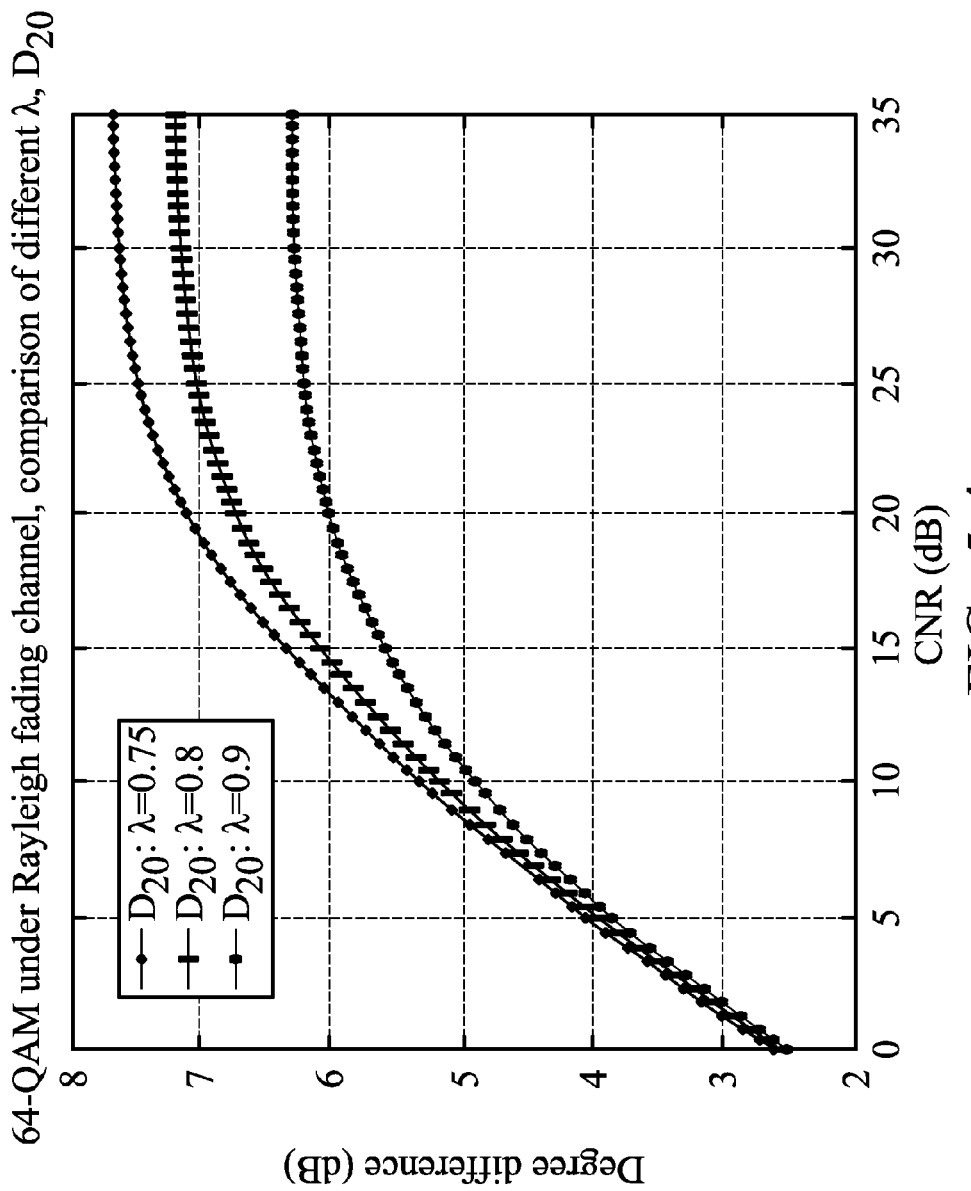

FIG. 5-1 shows the curves of degree difference $D_{10}$ under Gaussian white noise channel in the condition of the different hierarchical level distance ratio $\lambda$. FIG. 5-2 shows the curves of degree difference $D_{20}$ under Gaussian white noise channel in the condition of the different hierarchical level distance ratio $\lambda$. FIG. 5-3 shows the curves of degree difference $D_{10}$ under Rayleigh fading channel in the condition of the different hierarchical level distance ratio $\lambda$. FIG. 5-4 shows the curves of degree difference $D_{20}$ under Rayleigh fading channel in the condition of the different hierarchical level distance ratio $\lambda$.

According to the FIGS. 5-1 and 5-2, the hierarchical level distance ratio $\lambda$ is 0.75, 0.8 or 0.95. The curves of degree difference $D_{10}$ and degree difference $D_{20}$ under Gaussian white noise channel will increase as CNR rises, and the curves are concave such as the curves in the FIGS. 5-1 and 5-2. According to the FIGS. 5-3 and 5-4, the hierarchical level distance ratio $\lambda$ is 0.75, 0.8 or 0.95. The curves of degree difference $D_{10}$ and degree difference $D_{20}$ under under Rayleigh fading channel will increase as CNR rises at first, but finally the curves will tend to saturate. The curves of degree difference $D_{10}$ and degree difference $D_{20}$ under Rayleigh fading channel are convex such as the curves in the FIGS. 5-1 and 5-2. There are the different kinds of properties between the curves of the degree differences under the two different channels and this can serve as a foundation for channel classification.

Figures 1, 6:
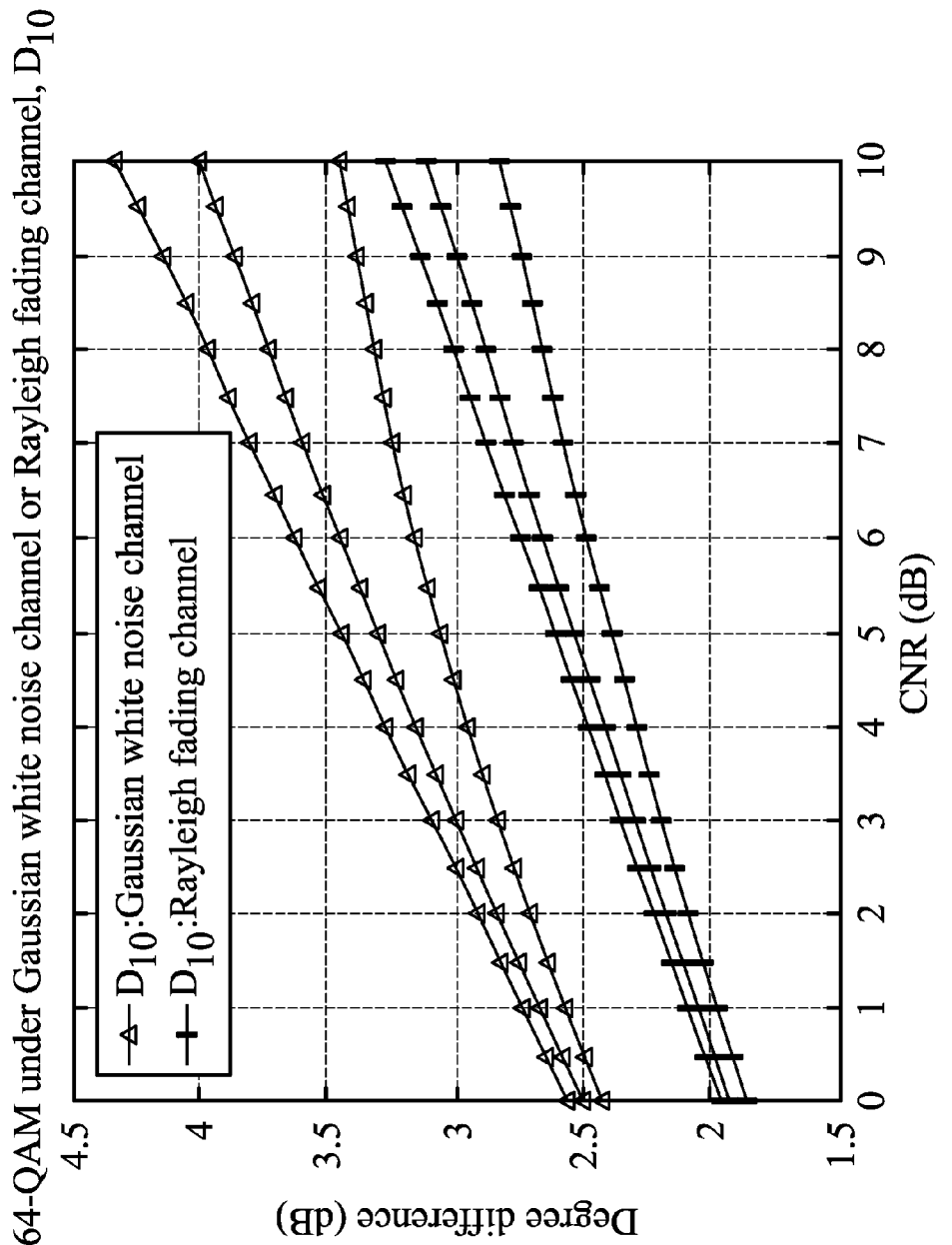
Figures 2, 6:
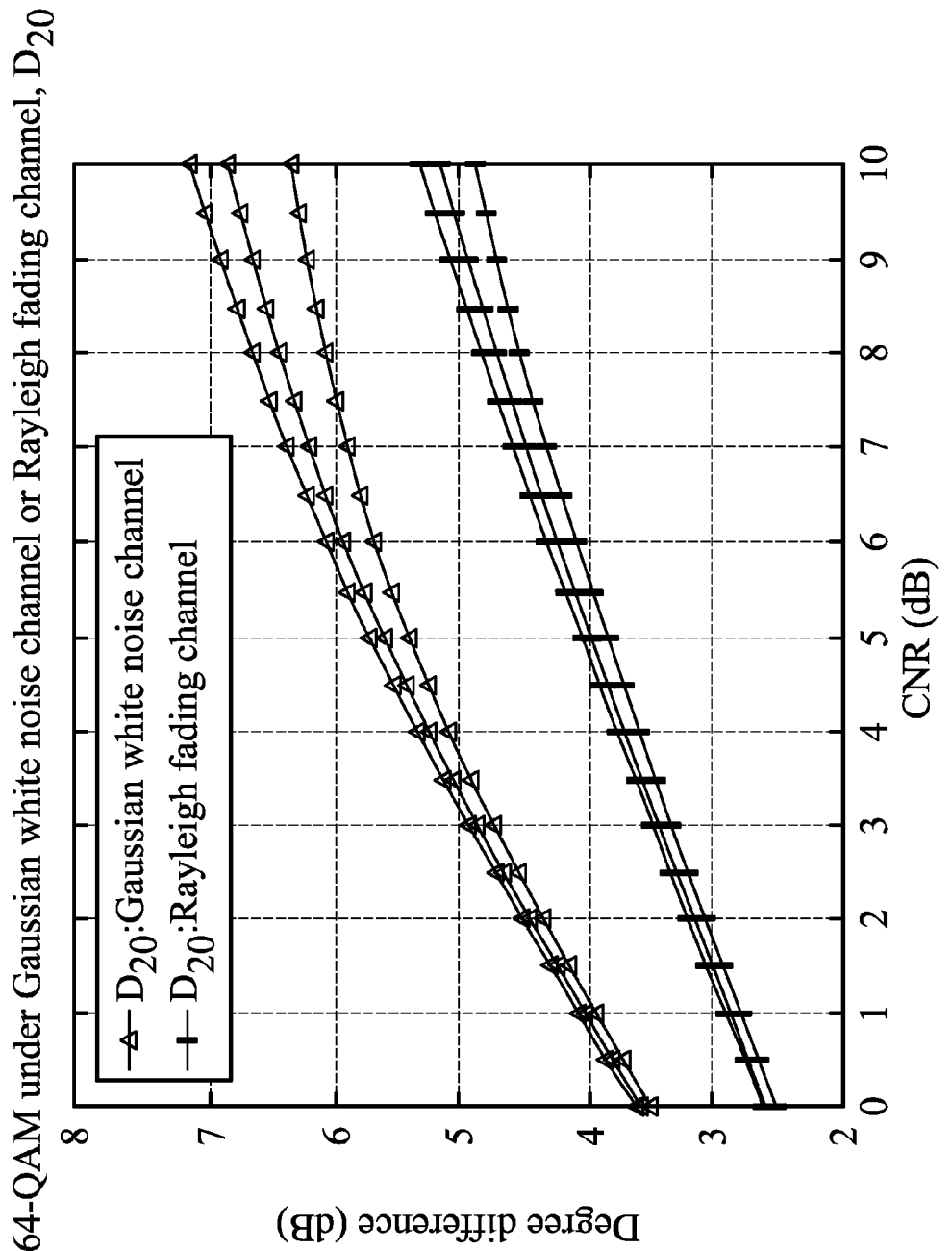

FIG. 6-1 is curve diagram of Degree difference $D_{10}$ under Gaussian white noise channel or Rayleigh fading channel by using 64-QAM modulation scheme according to an embodiment of the invention. FIG. 6-2 is curve diagram of Degree difference $D_{20}$ under Gaussian white noise channel or Rayleigh fading channel by using 64-QAM modulation scheme according to an embodiment of the invention.

According to the FIGS. 6-1 and 6-2, the tendency in the curves of degree difference $D_{10}$ and degree difference $D_{20}$ are not obvious in the different channels such as Gaussian white noise channel or Rayleigh fading channel when the curves of degree difference $D_{10}$ and degree difference $D_{20}$ are under lower CNR. Thus, channels are distinguished according to the absolute value of degree difference. $D_{10}$ or the absolute value of degree difference $D_{20}$. The absolutes value of degree differences $D_{10}$ under Gaussian white noise channel must be larger than the absolute values of degree differences $D_{10}$ under Rayleigh fading channel, and the absolutes value of degree differences $D_{20}$ under Gaussian white noise channel must be larger than the absolute values of degree differences $D_{20}$ under Rayleigh fading channel. Therefore, the channel classification can be still done under the lower CNR.

Figures 1, 7:
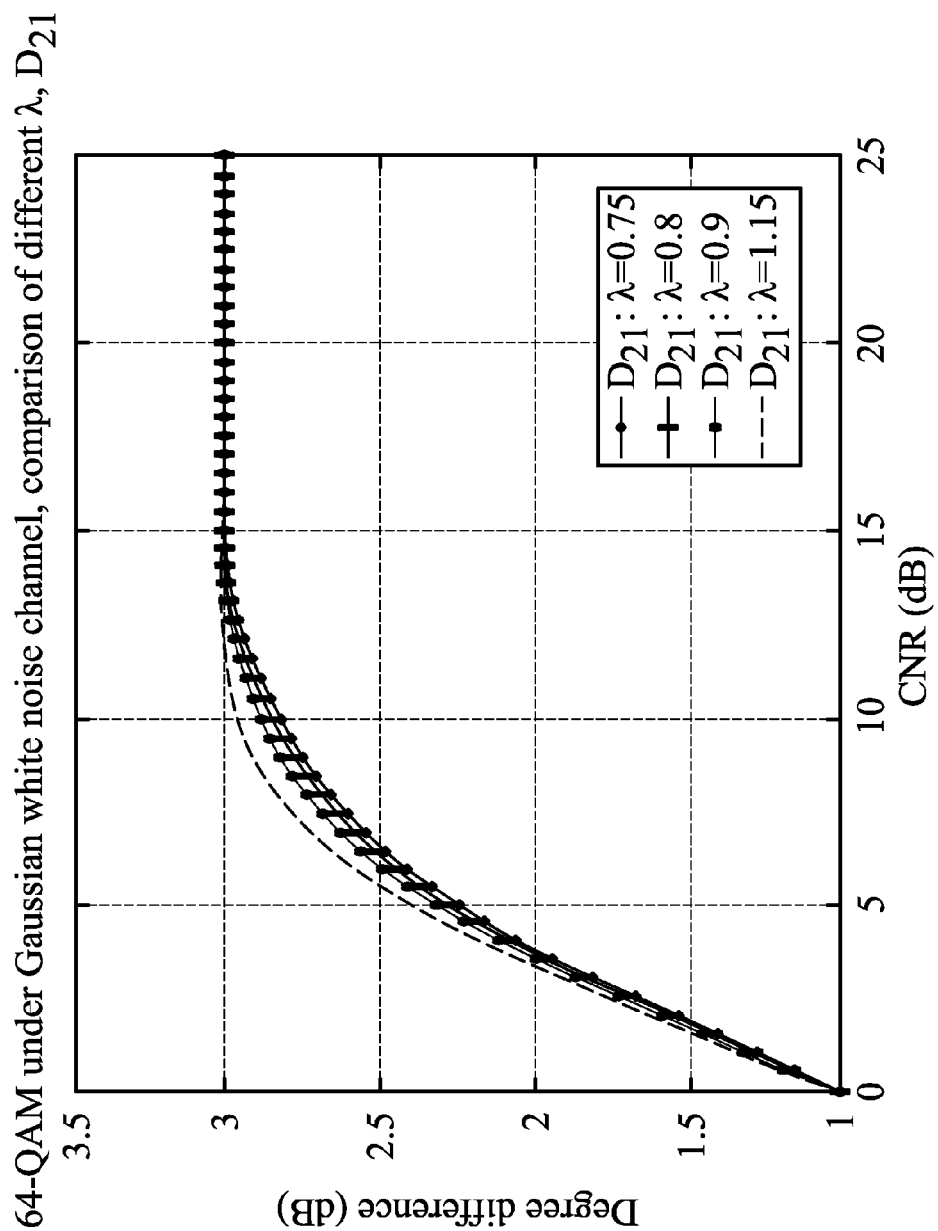
Figures 2, 7:
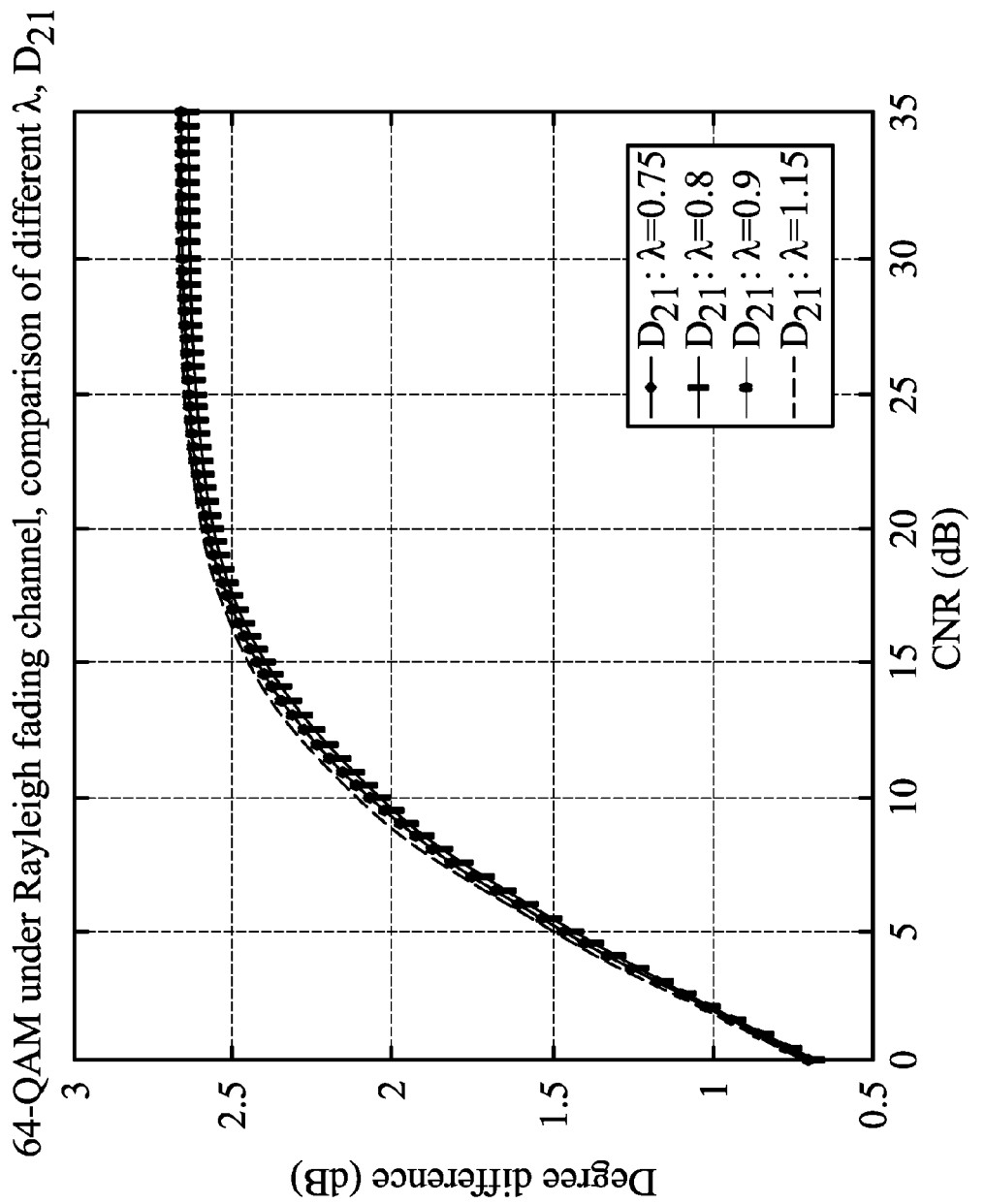

FIG. 7-1 is curve diagram of Degree difference $D_{21}$ under Gaussian white noise channel by using 64-QAM modulation scheme according to an embodiment of the invention, wherein the hierarchical level distance ratio $\lambda$ is 0.75, 0.8, 0.9 or 1.15. FIG. 7-2 is a curve diagram of Degree difference $D_{21}$ under Rayleigh fading channel by using 64-QAM modulation scheme according to an embodiment of the invention, wherein the hierarchical level distance ratio $\lambda$ is 0.75, 0.8, 0.9 or 1.15. According to the FIGS. 7-1 and 7-2, the curves of Degree difference $D_{21}$ under Rayleigh fading channel and the curves of Degree difference $D_{21}$ under Gaussian white noise channel are similar. Therefore, the curves of Degree difference $D_{21}$ can be regarded as the reference curves of Degree difference $D_{10}$ and Degree difference $D_{20}$.

Figure 8:
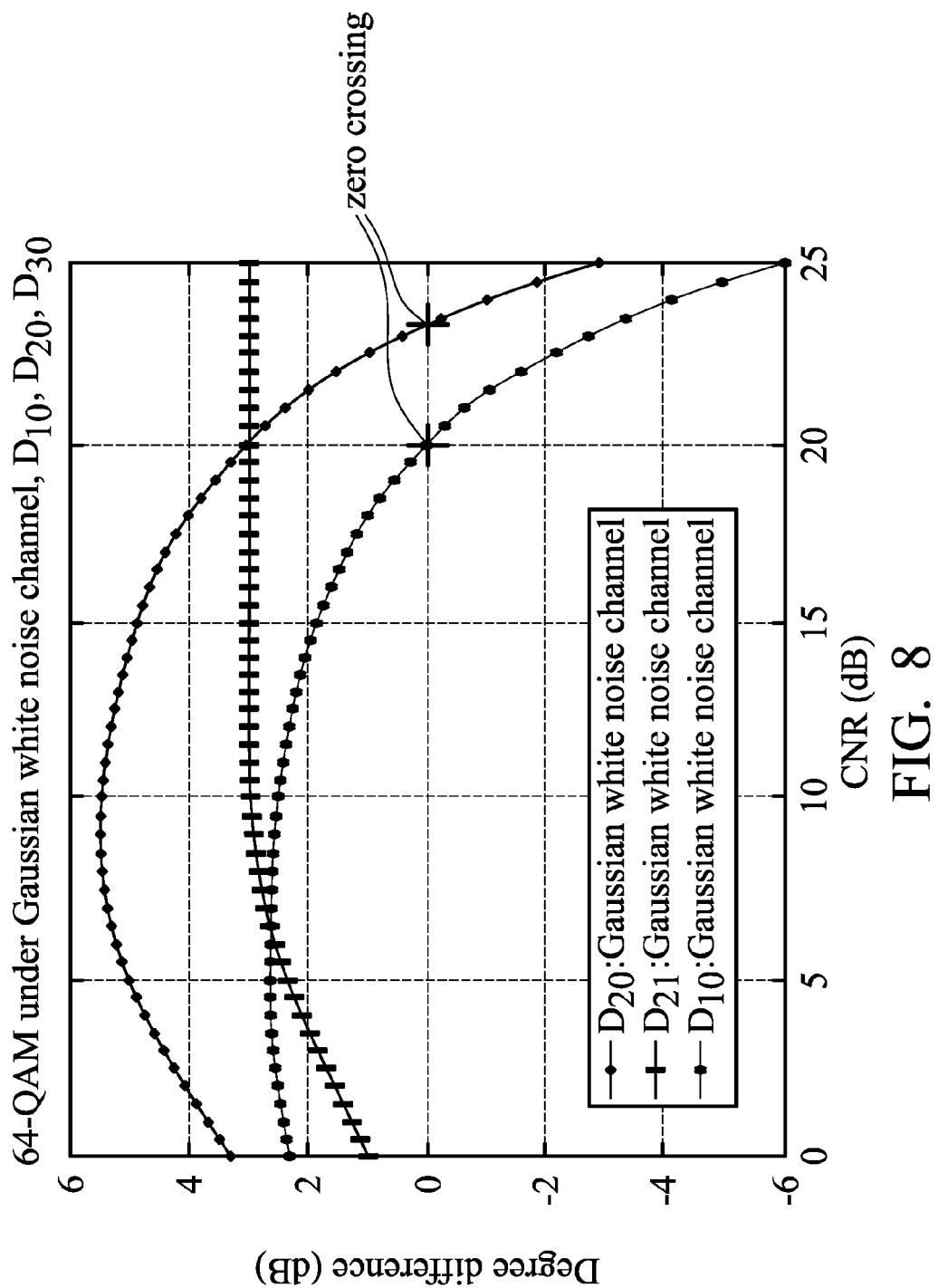
FIG. 8 is curve diagram of Degree difference $D_{10}$, Degree difference $D_{20}$ and Degree difference $D_{21}$ under the Gaussian white noise channel by using 64-QAM modulation scheme according to an embodiment of the invention, wherein the hierarchical level distance ratio λ is 1.15.

FIG. 8 is a curve diagram of Degree difference $D_{10}$, Degree difference $D_{20}$ and Degree difference $D_{21}$ under Gaussian white noise channel by using 64-QAM modulation scheme according to an embodiment of the invention, wherein the hierarchical level distance ratio $\lambda$ is 1.15. According to the FIG. 8, the values of Degree difference $D_{10}$ and Degree difference $D_{20}$ are zero at a predetermined CNR. For example, as shown in the FIG. 8, the value of Degree difference $D_{10}$ equals zero when the CNR is 20 dB and the value of Degree difference $D_{20}$ equals zero when the CNR is about 23 dB. The degree difference curves will cross at the diagrammatic line of degree difference which equals zero. That phenomenon is known as "Zero Crossing". If the phenomenon of "Zero Crossing" has occured, it means that the BER curves of different levels are crossing and it also indicates that the protection ability of each level has been changed.

The degree difference curves of degree differences 8-PSK or 64-QAM modulation scheme under different channels such as Gaussian white noise channel or Rayleigh fading channel have similar properties. However, the degree difference curves of the 8-PSK or 64-QAM modulation scheme have different properties under different parameters. For example, there is a phenomenon of "Zero Crossing" in the degree difference curves of 64-QAM modulation scheme under a predetermined CNR. Therefore, the degree difference curves of 8-PSK and 64-QAM modulation scheme show different channel properties.

The pilot signal analysis module 204 classifies channels according to properties of the degree difference curves in the above specification to generate the channel classification signal ES to a channel estimator 2051 of the channel detection module 205. Then the channel estimator 2051 transmits the best modulation indication signal IS according to the received channel classification signal ES to adjust the modulation scheme of transceiver 10 to the 8-PSK or 64-QAM scheme. The modulation scheme of transceiver 10 is adapted and adjusted according to the channel classification. This method can improve the system performance against channel effect and reduce the BER of the system.

Figure 9:
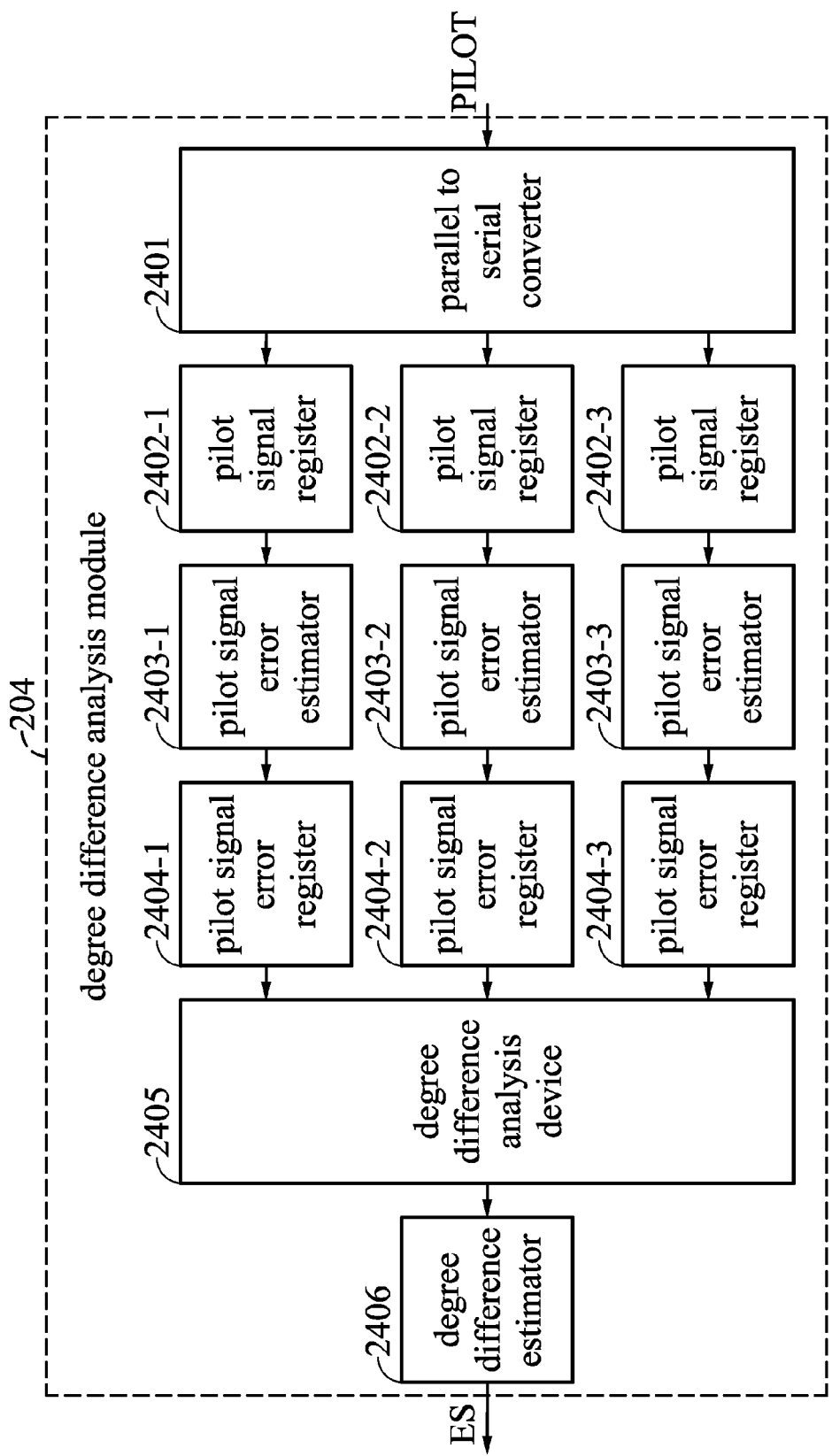
FIG. 9 is a block diagram illustrating the degree difference analysis module 204 (as shown in the FIG. 3) according to an embodiment of the invention.

FIG. 9 is a block diagram illustrating the degree difference analysis module 204 (as shown in the FIG. 3) according to an embodiment of the invention. The degree difference analysis module 204 comprises a parallel to serial converter (P/S converter) 2401 for dividing the demodulated processed pilots into a plurality of levels where one of the pluralities of levels comprises a plurality of level bits and outputs the refinement bits in each level to a plurality of pilot signal registers 2402. The plurality of pilot signal registers 2402 are configured to store refinement bits in each level. Taking 64-QAM as example, the pilot signal register 2402-1 stores the refinement bits of the zero level, the pilot signal register 2402-2 stores the refinement bits of the first level and the pilot signal register 2402-3 stores the refinement bits of the second level. A plurality of pilot signal error estimators 2403 are configured for comparing the stored refinement bits of each level in the pilot signal registers 2402 and the known refinement bits of each level in the pilots to obtain bit error rate of each level under different SNR. In other words, the pilot signal error estimator 2403-1 detects bit difference between the stored refinement bits of the base level and the known refinement bits in the base level of the pilot. The pilot signal error estimator 2403-2 detects the bit difference between the stored refinement bits of the first level and the known refinement bits in the first level of the pilot. The pilot signal error estimator 2403-3 detects the bit difference between the stored refinement bits of the second level and the known refinement bits in the third level of the pilot. A plurality of pilot signal error registers 2404 are configured for storing the bit error rate of each level. In other words, the pilot signal error register 2404-1 stores the bit error rate of the base level detected by the pilot signal error estimator 2403-1, and so on. A degree difference analysis device 2405 generates the plurality of degree differences according to ratios of bit error rates of the levels, and generates a plurality of degree difference curves according to the plurality of degree differences. For example, Degree difference $D_{10}$ is a ratio of bit error rate of refinement bits in a first level to bit error rate of base bits in a base level under same CNR. Then the degree differences under different CNR are connected to generate a degree difference curve. A degree difference estimator 2406 is configured for generating the channel classification signal ES to the channel estimator 2051 according to the degree difference curves obtained by the degree difference analysis device 2405. This invention may be also applied to a hierarchical constellation which has two levels or more levels in order to achieve channel classification by using the hierarchical constellation.

With the example and explanations above, the features and spirit of the invention are hopefully well described. Those skilled in the art will readily observe that numerous modifications and alterations of the embodiments may be made while retaining the teachings of the invention. Accordingly, the above disclosure should be construed as limited only by the metes and bounds of the appended claims.

What is claimed is:

1. A transceiver for an orthogonal frequency-division multiplexing (OFDM) system, comprising:
    a signal processing device receiving an OFDM symbol and processing the OFDM symbol to generate a processing signal according to the OFDM symbol, wherein the OFDM symbol having pilots which have been hierarchically modulated and the processing signal having processing pilots;
    a pilot signal analysis device collecting the processing pilots of the processing signal and demodulating the processing pilots to generate a plurality of levels where one of the plurality of levels comprises at least one refinement bits;
    a degree difference analysis module generating a plurality of degree differences according to the refinement bits and detecting channel classification according to the degree differences to transmit a channel classification signal; and
    a channel detection module generating and transmitting a modulation indication signal to another transceiver to adjust modulation scheme according to the channel classification signal, and detecting channel responses of the processed signal according to the processing pilots and compensating the processed signal to generate an output data.

2. The transceiver of claim 1, wherein the pilot signal analysis device comprises:
    a pilot signal collector collecting the processed pilots of the processed signal; and
    a hierarchical pilot signal demodulator for demodulating the processed pilots according to a phase shift keying (PSK) hierarchical constellation or a quadrature amplitude modulation (QAM) hierarchical constellation.

3. The transceiver of claim 2, wherein the degree difference analysis module comprises:
    a serial to parallel converter converting the demodulated processed pilots into the plurality of levels where one of the plurality of levels comprises at least one refinement bit according to the phase shift keying hierarchical constellation or the quadrature amplitude modulation hierarchical constellation and outputting the refinement bits in each of the plurality of levels;
    a pilot signal error detector detecting bit error rates of the levels;
    a degree difference analysis device generating the plurality of degree differences according to ratios of bit error rates of the levels, and generating a plurality of degree difference curves according to the plurality of degree differences; and
    a degree difference estimator classifying channels according to properties of the degree difference curves to generate the channel classification signal to the channel detection module.

4. The transceiver of claim 3, wherein a distribution of a plurality of constellation points of the quadrature amplitude modulation (QAM) hierarchical constellation is adjusted by a hierarchical level distance ratio.

5. The transceiver of claim 3, wherein a distribution of a plurality of constellation points of the phase shift keying (PSK) hierarchical constellation is adjusted by a plurality of adjustable phase parameters.

6. The transceiver of claim 3, wherein bit error rates of the levels comprise bit error rates of base bits in a base level, bit error rate of refinement bits in a first level and bit error rate of refinement bits in a second level.

7. The transceiver of claim 6, wherein the plurality of degree differences are obtained according to ratios of any two bit error rates of base bits in a base level, bit error rate of refinement bits in a first level and bit error rate of refinement bits in a second level under same carrier to noise ratio (CNR).

8. The transceiver of claim 7, wherein the the plurality of degree differences are a value of bit error rate of refinement bits in a first level divided by bit error rate of base bits in a base level, a value of bit error rate of refinement bits in a second level divided by bit error rate of base bits in a base level, and a value of bit error rate of refinement bits in a second level divided by bit error rate of refinement bits in a first level under same carrier to noise ratio (CNR).

9. The transceiver of claim 4, wherein the processing pilots are demodulated according to the quadrature amplitude modulation (QAM) hierarchical constellation and the degree difference curves are generated according to the degree differences corresponding to different carrier to noise ratio (CNR) such that the degree difference curves are related to the hierarchical level distance ratio.

10. The transceiver of claim 5, wherein the processing pilots are demodulated according to the phase shift keying (PSK) hierarchical constellation and the degree difference curves are generated according to the degree differences corresponding to different carrier to noise ratio (CNR) such that the degree difference curves are related to the adjustable phase parameters.

11. The transceiver of claim 3, wherein the properties of the degree difference curves comprise degree difference zero-crossing and curve inversion.

12. The transceiver of claim 9, wherein if the degree difference curves pass through zero value when the hierarchical level distance ratio is a first predetermined value and carrier to noise ratio (CNR) is a second predetermined value, the property of the degree difference curves is regarded as degree difference zero-crossing.

13. The transceiver of claim 10, if the degree difference curves turn upside down when the adjustable phase parameters are third predetermined values, the property of the degree difference curves is regarded as curve inversion.

14. The transceiver of claim 12, wherein if the degree difference curves pass through zero value when the hierarchical level distance ratio is 1.15 and carrier to noise ratio (CNR) is the second predetermined value, the property of the degree difference curves is regarded as degree difference zero-crossing.

15. The transceiver of claim 1, wherein the channel detection module further comprises a one-tap equalizer for compensating the channel responses.

16. The transceiver of claim 1, wherein the signal processing device further comprises a Fourier transform converter for transforming the OFDM symbol from time domain to frequency domain.

17. A channel classification method for an orthogonal frequency-division multiplexing (OFDM) system, comprising:
hierarchically modulating a plurality of pilots in an OFDM symbol;
transmitting the OFDM symbol, wherein the OFDM symbol is affected by channel effect;
processing the OFDM symbol to generate a processing signal according to the OFDM symbol by a signal processing device, wherein the processing signal having processing pilots;
collecting the processing pilots of the processing signal;
demodulating the processing pilots;
generating a plurality of degree differences according to the demodulated processing pilots, and detecting channel classification to transmit a channel classification signal to a channel detection module according to the degree differences; and
transmitting a modulation indication signal to another one transceiver to adjust modulation scheme according to the channel classification signal.

18. The channel classification method of claim 17, wherein the channel classification method further comprises:
demodulating the processed pilots according to a phase shift keying (PSK) hierarchical constellation or a quadrature amplitude modulation (QAM) hierarchical constellation.

19. The channel classification method of claim 18, wherein the channel classification method comprises:
converting the demodulated processed pilots into a plurality of levels where one of the plurality of levels comprises at least one refinement bit;
detecting bit error rates of the levels;
generating the degree differences according to ratios of the bit error rates of the levels;
generating a plurality of degree difference curves according to the degree differences; and
classifying channel according to properties of the degree difference curves to generate the channel classification signal to the channel detection module.

20. The channel classification method of claim 17, wherein a distribution of a plurality of constellation points of the quadrature amplitude modulation (QAM) hierarchical constellation is adjusted by a hierarchical level distance ratio.

21. The channel classification method of claim 17, wherein a distribution of a plurality of constellation points of the phase shift keying (PSK) hierarchical constellation is adjusted by a plurality of adjustable phase parameters.

22. The channel classification method of claim 19, wherein bit error rates of the levels comprise bit error rate of base bits in a base level, bit error rate of refinement bits in a first level and bit error rate of refinement bits in a second level.

23. The channel classification method of claim 22, wherein the plurality of degree differences are obtained according to ratios of bit error rate of base bits in a base level, bit error rate of refinement bits in a first level and bit error rate of refinement bits in a second level under same carrier to noise ratio (CNR).

24. The channel classification method of claim 23, wherein the plurality of degree differences are a value of bit error rate of refinement bits in a first level divided by bit error rate of base bits in a base level, a value of bit error rate of refinement bits in a second level divided by bit error rate of base bits in a base level and a value of bit error rate of refinement bits in a second level divided by bit error rate of refinement bits in a first level under same carrier to noise ratio (CNR).

25. The channel classification method of claim 20, wherein the processing pilots are demodulated according to the quadrature amplitude modulation (QAM) hierarchical constellation and the degree difference curves are generated according to the degree differences corresponding to different carrier to noise ratios (CNR) such that the degree difference curves are related to the hierarchical level distance ratio.

26. The channel classification method of claim 21, wherein the processing pilots are demodulated according to the phase shift keying (PSK) hierarchical constellation and the degree difference curves are generated according to the degree differences corresponding to different carrier to noise ratios (CNR) such that the degree difference curves are related to the adjustable phase parameters.

27. The channel classification method of claim 19, wherein the properties of the degree difference curves comprise degree difference zero-crossing and curve inversion.

28. The channel classification method of claim 25, wherein if the degree difference curves pass through zero value when the hierarchical level distance ratio is a first predetermined value and carrier to noise ratio (CNR) is a second predetermined value, the property of the degree difference curves is regarded as degree difference zero-crossing.

29. The channel classification method of claim 26, if the degree difference curves turn upside down when the adjustable phase parameters are third predetermined values, the property of the degree difference curves is regarded as a curve inversion.

30. The channel classification method of claim 28, wherein if the degree difference curves pass through zero value when the hierarchical level distance ratio is 1.15 and carrier to noise ratio (CNR) is the second predetermined value, the property of the degree difference curves is regarded as degree difference zero-crossing.

31. The channel classification method of claim 17, wherein the channel classification method further comprises compensating the channel responses generated by the channel effect.

32. The channel classification method of claim 17, wherein the channel classification method further comprises transforming the OFDM symbol from time domain to frequency domain.

* * * * *